May 20, 1924.
E. E. HILLS
DEVICE FOR CONSUMING BEVERAGES
Filed Jan. 24, 1923
1,494,742
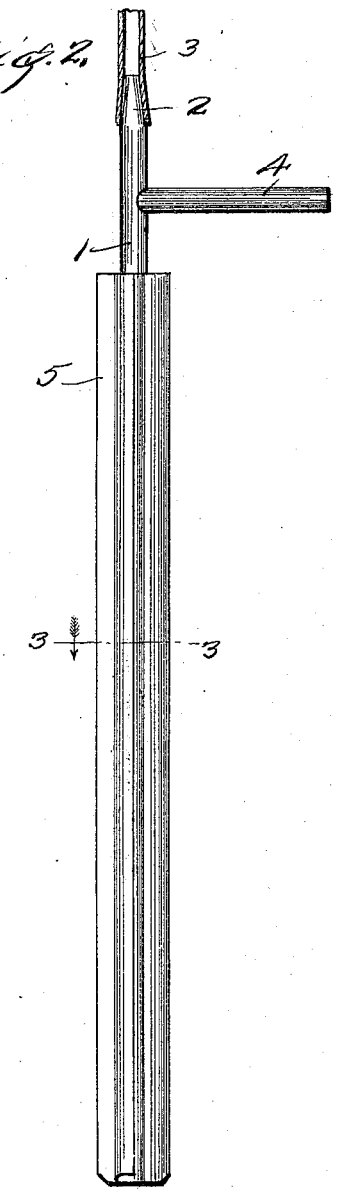
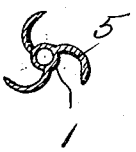
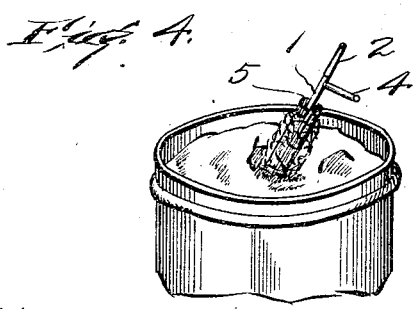
Inventor
Ernest E. Hills
By Richard B. Owen
Attorney Patented May 20, 1924.

1,494,742

UNITED STATES PATENT OFFICE.

ERNEST E. HILLS, OF APPLETON, WISCONSIN, ASSIGNOR OF ONE-FOURTH TO WILLIAM O. SEIWERT AND ONE-FOURTH TO ROBERT F. HILDEBRANDT, BOTH OF APPLETON, WISCONSIN.

DEVICE FOR CONSUMING BEVERAGES.

Application filed January 24, 1923. Serial No. 614,715.

*To all whom it may concern:*

Be it known that I, ERNEST E. HILLS, a citizen of the United States, residing at Appleton, in the county of Outagamie and State of Wisconsin, have invented certain new and useful Improvements in a Device for Consuming Beverages, of which the following is a specification.

The present invention relates to a device for consuming a beverage and has for its principal object to provide such a device with which a certain amount of ice cream or any other frozen confectionery may be mixed with a beverage for flavoring the same and consumed through the device.

Another important object of the device is to provide a structure capable of holding an amount of ice cream or the like so that the ice cream may be readily inserted into the ordinary soda bottle.

With the above and numerous other objects in view as will appear as the description progresses, the invention resides in certain novel features of construction, and the combination and arrangement of parts as will be hereinafter more fully described and claimed.

In the drawing—

Figure 1 is an elevational view showing my device as used,

Figure 2 is an elevation of the device,

Figure 3 is a transverse section taken substantially on the line 3—3 of Figure 2 looking in the direction of the arrow, and Figure 4 is a perspective view showing the upper portion of an ice cream can with my device inserted therein.

Referring to the drawing in detail it will be seen that the device consists of a tube 1 which is tapered at its upper end as at 2 for receiving an ordinary soda straw 3. A handle 4 projects transversely adjacent the upper end of the tube 1 so that the device may be readily handled. Ice cream holding means is situated on the base portion of the tube 1 and includes a plurality of transversely curved blades 5 which are curved concentrically with each other as is illustrated to advantage in Figure 3.

In using the device it is first inserted in an ice cream container as is illustrated in Figure 4 and then turned to the right or in a clockwise direction which will cause the cream to cling between the blades 5. The device is then removed from the ice cream can and inserted in a bottle of beverage as is shown in Figure 1. Such a beverage would preferably be of the ordinary soda type which is carbonated and now commonly sold on the market. With the device in the position shown in Figure 1 a soda straw may be inserted on the tapered end 2 thereof and the contents of the bottle drawn therefrom and drank by the user. The beverage will be saturated by the ice cream clinging to the blades 5 and thereby flavored. From experience it has been found that this produces a novel and very palatable beverage which is enjoyed by those who have tasted the same.

Although I have described my device with a certain degree of particularity it is to be understood that only the preferred construction has been illustrated and that numerous changes in the details of construction and the combination and arrangement of parts may be resorted to without departing from the spirit of the invention as hereinafter claimed.

Having thus described my invention what I claim as new is:—

1. In combination, a drinking tube and a plurality of blades radiating therefrom.

2. In combination, a drinking tube and a plurality of curved blades extending therefrom.

3. In combination, a drinking tube and a plurality of blades radiating from the drinking tube and extending longitudinally thereof substantially throughout the entire length thereof.

4. In combination, a drinking tube, a plurality of blades extending from the drinking tube, each blade extending longitudinally of the drinking tube substantially the entire length thereof and curved transversely.

5. In combination, a drinking tube, a plurality of blades extending from the drinking tube substantially the length thereof and a handle provided on the drinking tube at a point not provided with the blade.

In testimony whereof I affix my signature in presence of two witnesses.

ERNEST E. HILLS.

Witnesses:
  M. E. PFEFFER,
  CARL J. BECHER.